United States Patent [19]

Meyer

[11] Patent Number: 4,574,073

[45] Date of Patent: Mar. 4, 1986

[54] PROCESS FOR MANUFACTURING COARSE, CRYSTALLINE ALUMINA

[75] Inventor: Klaus Meyer, Schaffhausen, Switzerland

[73] Assignee: Swiss Aluminium Ltd., Chippis, Switzerland

[21] Appl. No.: 694,032

[22] Filed: Jan. 23, 1985

Related U.S. Application Data

[63] Continuation of Ser. No. 477,863, Mar. 23, 1983, abandoned.

[30] Foreign Application Priority Data

Mar. 29, 1982 [CH] Switzerland .......................... 1911/82

[51] Int. Cl.[4] ................................................ C01F 7/02
[52] U.S. Cl. .................................... 423/111; 423/625
[58] Field of Search ............................ 423/111, 625; 156/DIG. 61

[56] References Cited

U.S. PATENT DOCUMENTS

| | | | |
|---|---|---|---|
| 2,887,361 | 5/1959 | Fenerty | 423/111 |
| 4,193,768 | 3/1980 | Ohishi et al. | 423/625 |
| 4,374,119 | 2/1983 | Schepers et al. | 423/625 |

FOREIGN PATENT DOCUMENTS

| | | | |
|---|---|---|---|
| 1159417 | 12/1963 | Fed. Rep. of Germany | 423/625 |
| 3036279 | 4/1982 | Fed. Rep. of Germany | 423/625 |

*Primary Examiner*—H. T. Carter
*Attorney, Agent, or Firm*—Bachman & LaPointe

[57] ABSTRACT

The invention relates to a process for manufacturing coarse, crystalline alumina which, after preparation in a generally known manner, is suitable for use as grinding, lapping and polishing materials. The process comprises the calcining of alumina from dry absorption scrubbing units employed in connection with fused salt reduction cells producing aluminum.

7 Claims, 1 Drawing Figure

PROCESS FOR MANUFACTURING COARSE, CRYSTALLINE ALUMINA

CROSS-REFERENCE TO RELATED APPLICATION

This application is a Continuation of U.S. patent application Ser. No. 477,863, Filed Mar. 23, 1983 now abandoned.

BACKGROUND OF THE INVENTION

The present invention relates to a process for manufacturing coarse, crystalline alumina which, after a generally known method of further preparation is advantageously suitable for use as a grinding, lapping and polishing material or for refractory purposes.

In the abrasive manufacturing industry there is a great demand for single crystal corundum of particle size 800 to 200 on the FEPA scale, corresponding to an average particle size of about 10–70 $\mu$.

It has already been pointed out several times that it is basically possible to manufacture the desired single crystals of corundum directly in the production of alumina, thus circumventing the expensive and technically involved route employing melting and sintering processes. Up to now, however, all economically acceptable efforts have failed because of the inadequate size of the crystals obtained and/or because of their extremely thin platelet appearance.

The present invention overcomes these difficulties. The alumina according to the invention comprises thick platelet corundum crystals which are delimited by natural crystal faces, occur in the above mentioned particulate range and can be manufactured economically.

Alumina is normally produced on a large scale using the Bayer process in which bauxite is digested in a caustic soda solution in which aluminum hydroxide is precipitated in the form of agglomerates up to approximately 100$\mu$ in size. The aluminum hydroxide is converted to alumina by calcination in rotary or fluidized bed furnaces.

Alumina produced this way is not, or only to a very limited degree, useable for the above mentioned purposes, possibly for example as a polishing material.

There has been no lack of attempts to produce via the Bayer process alumina products which exhibit in particular the properties of grinding and lapping abrasive materials. It is known that the addition of small amounts of so-called calcining agents or mineralisers accelerate the transformation to $\alpha$-aluminum oxide and/or lower the temperature at which the transformation takes place. At the same time there is a shift in the particle size distribution towards larger size particles.

Effective in this respect are halides, either singly or in combination, in particular the fluorides NaF, CaF$_2$, AlF$_3$ and Na$_3$AlF$_6$, compounds of boron, vanadium and phosphorus (see e.g. German patents or patent application Nos. DE-AS 10 41 853, DE-AS 11 59 418, DE-AS 17 67 511, DE-OS 26 23 482). According to DE-AS 11 59 418 some tenths of a percent of gaseous hydrogen fluoride in the atmosphere of the kiln or furnace has the same effect.

The temperature of the conversion to $\alpha$-aluminum hydroxide and its particle size can be varied within certain limits depending on the rate of throughput, rate of heating up and the type and amount of fluorine compound.

According to DE-AS No. 28 50 064 multiple crystallization accompanied by the use of a seeding agent, an already calcined product, fluorine containing additives and aluminum hydroxide agglomerates of >60 $\mu$ corundum crystals, it is possible to manufacture $\alpha$-Al$_2$O$_3$ with diameters D as the largest dimension perpendicular to the c-axis of a size 16$\mu$ to at most 250$\mu$ with diameter to height ratios D/H of 3–7, the height H being the largest dimension parallel to the c-axis.

With processes employing no seeding crystals only $\alpha$-Al$_2$O$_3$ crystals of extremely thin platelet, hexagonal appearance have been obtained up to now. The crystals have at best a diameter D of 25$\mu$, the greater part however of diameter around 10$\mu$. The height H in some samples examined lie at about one quarter of the diameter D; in over 80% of the crystals the height H is only one sixth to one tenth of the diameter D.

The disadvantage of such crystals for grinding, lapping and polishing purposes lies in the too small particle size and/or in particular in the large diameter to height ratio D/H. Plate-shaped corundum crystals less than 10$\mu$ in diameter are of hardly any use to the surface preparation industry. Crystals of large diameter but large D/H ratios fracture very easily when used as a grinding agent, especially when lapping and polishing, and produce cutting edges of random geometry. The claimed advantage of the single crystal particles, with constant cutting geometry on all particles due to the natural crystal faces and the high, specific proportion of cutting edges is at least partly eliminated by such fracturing of particles.

For this reason alumina products made via the calcination of aluminum hydroxide have up to now not found the expected acceptance in surface treatment applications.

SUMMARY OF THE INVENTION

The object of the present invention is to produce an advantageous single crystal grinding, lapping and polishing material from calcined alumina. In particular it is intended to produce crystals which on average have a diameter D approximately equal to or greater than 10$\mu$, and at the same time exhibit a small D/H ratio.

The process of the present invention comprises a process for manufacturing coarse, crystalline alumina, $\alpha$-Al$_2$O$_3$, of average crystal diameter larger than or equal to 10 $\mu$ by means of calcination, in which charged dry absorption alumina is employed as the starting product.

BRIEF DESCRIPTION OF THE DRAWING

The drawing represents a photomicrograph at a magnification of 600X showing a typical agglomerate of crystals of the present invention.

DETAILED DESCRIPTION

Dry absorption alumina is understood as the alumina employed in the aluminum industry for dry scrubbing the waste gases (gas, vapor, dust) given off during the reduction process. Charged dry absorption alumina is that alumina which has already been employed for scrubbing the gases and contains therefore all the impurities picked up during the cleaning process.

The cleaning process is approximately as follows: The volatile components present in the cell during the electrolytic production of aluminum, and the smaller amounts of elements released in the form of compounds are adsorbed by the dry absorption alumina. The charged alumina is then fed to the reduction cells whereby almost all of the sodium and fluorine is returned to the cells; this is highly desireable, but at the same time also impurities which become enriched in this recycling process are returned to the cell consequently lowering the quality of the aluminum.

In general alumina is classified according to its physical properties basically into two main groups viz., sandy and floury alumina. The words "sandy" and "floury" indicate a typical characteristic of these forms of alumina. Apart from these main groups there is also intermediate alumina which exhibits to various degrees properties of both above mentioned aluminas.

Features which distinguish the intermediate aluminas from sandy alumina are a larger fraction of small particles i.e. the fraction of particles less than or equal to 44μ, and a strong tendency for creating dust.

With floury alumina the degree of calcination is high, therefore the weight-loss on heating and the specific surface area (by BET) are low, weight-loss below 0.25%, specific surface area 1-2 m²/g. The degree of calcination of sandy alumina is lower, the weight-loss being about 0.5-1% and the specific surface area (by BET) around 30-60 m²/g.

For dry absorption purposes in aluminum production only aluminas of such high specific surface areas (by BET) are employed. Depending on the calcining conditions, these aluminas exhibit about 10-60% of $\alpha$-$Al_2O_3$ (corundum). Preferred, however, are aluminas with an $\alpha$-$Al_2O_3$ content of 6-15%.

After they have been employed for dry absorption purposes in connection with the aluminum fused salt electrolytic process, these charged aluminas are found to exhibit on analysis the concentrations (wt. %) of elements e.g. as shown in Table I.

TABLE I

| Charged dry absorption alumina | Na | F | Si | Ti | % ppm Cr | V | P | Ga | Fe |
|---|---|---|---|---|---|---|---|---|---|
| I | 1-3 | 4.3 | 200 | 60 | 5-10 | 300 | 80 | 300 | 300 |
| II | 1 | 0.5 | 250 | 40 | 1-5 | 200 | 80 | 500 | 500 |
| III | 0.6 | 0.76 | 80 | 150 | — | 60 | 200 | 80 | 500 |

The quantities of these elements present depend of course on the length of time the dry absorption alumina has been in service.

As the charged dry absorption alumina is normally fed to the reduction cell, with temporary holding of the charged dry absorption alumina and/or discontinuous feeding of this alumina to the cell or alumina silo on the cell, the smelter supervisors try to have the lowest possible degree of contamination of that alumina in order to avoid discontinuous contamination in the reduction cell.

In a further version of the invention it has been found that, depending on the degree of contamination i.e. charging and desired size of crystal in the end product, it can be advantageous to add to the charged dry absorption alumina mineralizers and/or agents to promote crystallization. Particularly useful in this respect is a mineralizer compound of the type $X(BF_4)_n$ where X stands for $NH_3$ and metallic elements in particular metallic elements of valencies 1 and 2, and n is the valency value of X.

On the other hand it is also within the scope of the invention to employ charged dry absorption alumina as mineralizer and/or crystallizing agent in processes which were mentioned at the start for manufacturing coarse, crystalline alumina and use aluminum hydroxide.

Further advantages, features and details of the invention are revealed in the following description of preferred exemplified embodiments.

Charges each weighing 50 g were calcined, stationary, at 1300° C. in a silicon carbide rod furnace. The starting product for all trials was the only slightly charged dry absorption alumina type III in Table I.

The results of the laboratory trials are presented in Table II.

TABLE II

| Trial | Starting product Composition | Mineralizer | End product Crystal size (average diameter) |
|---|---|---|---|
| 1 | 100% TA-alumina | — | 15μ |
| 2 | 70% TA-alumina/ 30% Al(OH)₃ | — | 12μ |
| 3 | 50% TA-alumina/ 50% Al(OH)₃ | — | 12μ |
| 4 | 30% TA-alumina/ 70% Al(OH)₃ | — | 10μ |
| 5 | 10% TA-alumina/ 90% Al(OH)₃ | — | 5μ |
| 6 | 99% TA-alumina | 1% AlF₃ | up to 100μ |
| 7 | 99% TA-alumina | 1% NH₄BF₄ | up to 60μ |
| 8 | 98.8% TA-alumina | 0.6% Na₃AlF₆/ 0.6% B₂O₃ | up to 60μ |
| 9 | 99% TA-alumina | 1% KBF₄ | up to 100μ |
| 10 | 30% TA-alumina/ 69% Al(OH)₃ | 1% NaBF₄ | 20μ |
| 11 | 10% TA-alumina/ 89% Al(OH)₃ | 1% NaBF₄ | 15μ |

Table III lists the composition of the product obtained from trial No. 1. The products of all trials were made up of agglomerated, thick-platelet $\alpha$-$Al_2O_3$ crystals with a D/H ratio of 1-3. FIG. 1 shows, at a magnification of 600 times, a typical agglomerate of crystals.

TABLE III

| Trial No. 1 | |
|---|---|
| Na | 0.5% |
| Fe | 400 ppm |
| Si | 60 ppm |
| Ti | 100 ppm |
| Ga | 80 ppm |
| Ni | 25 ppm |
| V | 30 ppm |
| P | 80 ppm |
| F | — |

As can be seen in FIG. 1, the crystals exhibit to some degree a screw-like growth characteristic, which could be a sign that growth has not yet reached an end.

Surprisingly there are almost no signs of the $\beta$-phase ($Al_2O_3$, NaO. 11 $Al_2O_3$) having been formed, even though the alkali content at the start of the process was high. X-ray studies showed that the calcined end product made according to the process of the invention is comprised almost completely of corundum, $\alpha$-$Al_2O_3$. The $\beta$-$Al_2O_3$ interference 002 (CuK$\alpha$, d=11,3Å) was only faintly detectable, or was not at all to be seen, in all of the samples. Otherwise the crystals are clear and free of inhomogeneities. The α-Al$_2$O$_3$ lines on the X-ray diagram were all sharp, which is a sign of defect-free crystals.

It is to be expected that, if the degree of charging of the dry absorption alumina is increased, the α-Al$_2$O$_3$ crystals produced will be larger.

The agglomerates of particles are readily separated using known methods and divided up in single crystal fractions. They can then be used as polishing, lapping and grinding materials.

The process according to the invention offers, in addition to the technical advantages also, and in particular, economic advantages: By employing the charged dry absorption alumina as the starting product for manufacturing coarse, crystalline alumina the need for adding expensive calcining agents and/ or mineralizers which involve extra stages in the manufacturing process is eliminated. By tapping off a part of the charged alumina for this purpose the contamination of the aluminum is reduced slightly.

What is claimed is:

1. A process for manufacturing single crystal, coarse, crystalline alumina, α-Al$_2$O$_3$, of average crystal diameter larger than or equal to 10μ suitable for grinding, lapping and polishing which comprises providing a material consisting of charged dry absorption alumina from dry absorption scrubbing units for dry scrubbing the waste gases given off during the aluminum reduction process in connection with fused salt reduction cells producing aluminum, said material containing all of the impurities picked up during said process and calcining the starting material to provide single crystal, coarse, crystalline alumina having an average crystal diameter larger than or equal to 10 μ.

2. A process according to claim 1 including the step of calcining the starting material in the presence of a mineralizer.

3. A process according to claim 2 wherein X(BF$_4$)$_n$ is employed as mineralizer, wherein X stands for NH$_4$ and metallic elements, and n the valency value of X, B stands for boron and F stands for fluorine.

4. A process according to claim 3 wherein said metallic elements are sodium and potassium.

5. A process according to claim 1 wherein the resultant crystal has a diameter to height ratio D/H of from 1-3.

6. A process according to claim 1 wherein the resultant product is an agglomeration of crystals, and including the step of separating the agglomerates into single crystal fractions.

7. A process according to claim 1 wherein aluminum hydroxide is added to the charged dry absorption alumina.

* * * * *